US011111009B1

(12) United States Patent
Beckman et al.

(10) Patent No.: US 11,111,009 B1
(45) Date of Patent: Sep. 7, 2021

(54) OPERATING MULTIROTOR AIRCRAFT WITH ENHANCED YAW CONTROL

(71) Applicant: Amazon Technologies, Inc., Seattle, WA (US)

(72) Inventors: Brian C. Beckman, Newcastle, WA (US); Michael John Elzinga, Woodinville, WA (US); Scott Raymond Harris, Bainbridge Island, WA (US); Louis Leroi LeGrand, III, Seattle, WA (US); Frederik Schaffalitzky, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 815 days.

(21) Appl. No.: 15/592,866

(22) Filed: May 11, 2017

Related U.S. Application Data

(63) Continuation of application No. 14/734,823, filed on Jun. 9, 2015, now Pat. No. 9,764,829.

(51) Int. Cl.
*B64C 27/52* (2006.01)
*B64C 27/22* (2006.01)
*B64C 27/12* (2006.01)
*B64C 27/08* (2006.01)

(52) U.S. Cl.
CPC .............. *B64C 27/22* (2013.01); *B64C 27/08* (2013.01); *B64C 27/12* (2013.01); *B64C 27/52* (2013.01)

(58) Field of Classification Search
CPC ......... B64C 27/08; B64C 27/20; B64C 27/22; B64C 27/26; B64C 27/52; B64C 29/0033; B64C 2201/108
See application file for complete search history.

(56) References Cited

U.S. PATENT DOCUMENTS

| 3,721,403 | A | * | 3/1973 | Gray | B64C 27/02 244/7 A |
|---|---|---|---|---|---|
| 5,203,520 | A | * | 4/1993 | Przygodzki | B60F 5/02 244/17.19 |
| 5,419,514 | A | * | 5/1995 | Ducan | B64C 29/0033 244/12.4 |
| 8,052,081 | B2 | * | 11/2011 | Olm | B64C 39/024 244/17.23 |
| 8,133,155 | B2 | | 3/2012 | Ehinger et al. | |
| 8,453,962 | B2 | | 6/2013 | Shaw | |
| 9,004,396 | B1 | * | 4/2015 | Colin | B64D 47/08 244/17.23 |
| 9,469,394 | B2 | * | 10/2016 | Vaughn | A63H 27/12 |

(Continued)

FOREIGN PATENT DOCUMENTS

IL 234443 A 3/2019

*Primary Examiner* — Jonathan C Weber
(74) *Attorney, Agent, or Firm* — Athorus, PLLC

(57) ABSTRACT

This disclosure describes a configuration of a multirotor aircraft that will facilitate enhanced yaw control. The multirotor aircraft includes one or more adjustable members that will twist the frame of the multirotor aircraft, thereby adjusting the orientation of the motors and propellers and enhance the yaw control of the multirotor aircraft. In some implementations, the adjustable member(s) are passive and twist in response to differential thrusts generated by the propellers. In other implementations, the adjustable members are active and twist in response to a yaw command from the multirotor aircraft control system.

20 Claims, 10 Drawing Sheets

(56) References Cited

U.S. PATENT DOCUMENTS

| | | | |
|---|---|---|---|
| 9,764,829 B1* | 9/2017 | Beckman | B64C 15/14 |
| 9,902,493 B2* | 2/2018 | Simon | B64C 29/0025 |
| 10,173,777 B1* | 1/2019 | Carmack | B64C 39/024 |
| 10,322,796 B2* | 6/2019 | Lee | B64C 39/024 |
| 10,343,774 B2* | 7/2019 | Duque | B64C 39/024 |
| 2002/0104922 A1* | 8/2002 | Nakamura | B64C 27/08 244/17.25 |
| 2005/0178882 A1* | 8/2005 | Akaro | B64C 27/08 244/17.11 |
| 2005/0236517 A1* | 10/2005 | Akaro | B64C 27/08 244/17.23 |
| 2006/0266879 A1* | 11/2006 | Svoboda, Jr. | B64C 27/08 244/7 A |
| 2007/0023581 A1* | 2/2007 | La | B64C 27/20 244/165 |
| 2009/0008499 A1* | 1/2009 | Shaw | B64C 27/20 244/17.23 |
| 2010/0044499 A1* | 2/2010 | Dragan | B64C 1/30 244/17.23 |
| 2010/0243794 A1* | 9/2010 | Jermyn | A63H 27/12 244/17.23 |
| 2011/0015034 A1* | 1/2011 | Ehinger | B64C 27/08 477/70 |
| 2011/0017865 A1* | 1/2011 | Achtelik | B64C 27/08 244/17.23 |
| 2012/0083945 A1* | 4/2012 | Oakley | B64C 27/08 701/2 |
| 2012/0208673 A1 | 8/2012 | Ehinger et al. | |
| 2012/0298793 A1* | 11/2012 | Weddendorf | F03D 5/00 244/17.23 |
| 2013/0068892 A1* | 3/2013 | Bin Desa | B64C 39/024 244/190 |
| 2013/0105620 A1* | 5/2013 | Abde Qader Alzu'bi | B64C 27/20 244/17.13 |
| 2013/0105635 A1* | 5/2013 | Alzu'bi | B64C 39/024 244/23 A |
| 2013/0134254 A1* | 5/2013 | Moore | B64D 1/16 244/17.11 |
| 2013/0320133 A1* | 12/2013 | Ratti | B64C 33/02 244/22 |
| 2014/0138477 A1* | 5/2014 | Keennon | B64C 11/32 244/17.23 |
| 2014/0217229 A1* | 8/2014 | Chan | B64C 29/02 244/6 |
| 2014/0236388 A1* | 8/2014 | Wong | B64C 19/00 701/2 |
| 2014/0263822 A1* | 9/2014 | Malveaux | B64C 39/024 244/17.23 |
| 2014/0263823 A1* | 9/2014 | Wang | B64C 39/024 244/17.23 |
| 2015/0012154 A1* | 1/2015 | Senkel | B64D 17/80 701/4 |
| 2015/0021429 A1* | 1/2015 | Reichert | B64C 27/04 244/17.23 |
| 2015/0028155 A1* | 1/2015 | Reiter | B64C 27/16 244/39 |
| 2015/0057844 A1* | 2/2015 | Callou | B64C 27/08 701/3 |
| 2015/0175258 A1* | 6/2015 | Lee | B64C 27/08 244/17.23 |
| 2015/0212523 A1* | 7/2015 | Wolf | B64D 47/00 701/5 |
| 2015/0225071 A1* | 8/2015 | Tighe | B64C 29/02 244/12.4 |
| 2015/0259066 A1* | 9/2015 | Johannesson | B64C 27/08 244/17.27 |
| 2015/0274286 A1* | 10/2015 | Kereth | B64C 27/10 244/17.21 |
| 2015/0298799 A1* | 10/2015 | Bertrand | A63H 27/12 701/23 |
| 2015/0314881 A1* | 11/2015 | Tsaliah | B64D 17/72 244/146 |
| 2016/0001878 A1* | 1/2016 | Lee | B64C 3/38 244/7 A |
| 2016/0001879 A1* | 1/2016 | Johannesson | B64C 27/50 416/142 |
| 2016/0010627 A1* | 1/2016 | Austin | F03D 3/02 290/55 |
| 2016/0016664 A1* | 1/2016 | Basuni | B64C 39/024 244/17.13 |
| 2016/0107751 A1* | 4/2016 | D'Andrea | B64C 27/32 701/4 |
| 2016/0114887 A1* | 4/2016 | Zhou | B60F 5/02 348/148 |
| 2016/0122016 A1* | 5/2016 | Mintchev | B64C 39/024 244/17.23 |
| 2016/0123182 A1* | 5/2016 | Samaritano | B64C 27/08 416/1 |
| 2016/0137298 A1* | 5/2016 | Youngblood | A63H 27/12 244/17.23 |
| 2016/0207625 A1* | 7/2016 | Judas | B64C 29/0025 |
| 2016/0291598 A1* | 10/2016 | Youmans | G05D 1/0858 |
| 2017/0129601 A1* | 5/2017 | Babel | B64C 27/08 |
| 2019/0135420 A1* | 5/2019 | Regev | B64C 27/22 |
| 2019/0258273 A9* | 8/2019 | Youmans | B64C 17/02 |

* cited by examiner

OPERATING MULTIROTOR AIRCRAFT WITH ENHANCED YAW CONTROL

CROSS-REFERENCE TO RELATED APPLICATION

This application is a continuation of and claims priority to U.S. application Ser. No. 14/734,823, filed Jun. 9, 2015, entitled "Multirotor Aircraft with Enhanced Yaw Control," which is incorporated herein by reference in its entirety.

BACKGROUND

Multirotor aircrafts, such as propeller based aerial vehicles (e.g., quadcopters, octo-copters) are becoming more common. Many multirotor aircrafts include a navigation or flight control system that is used to control the flight and navigation of the multirotor aircraft. Typically, the pitch, yaw, and roll of a multirotor aircraft is accomplished by adjusting the rotational speed of one or more of the propellers of the multirotor aircraft in response to a command from the flight control system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
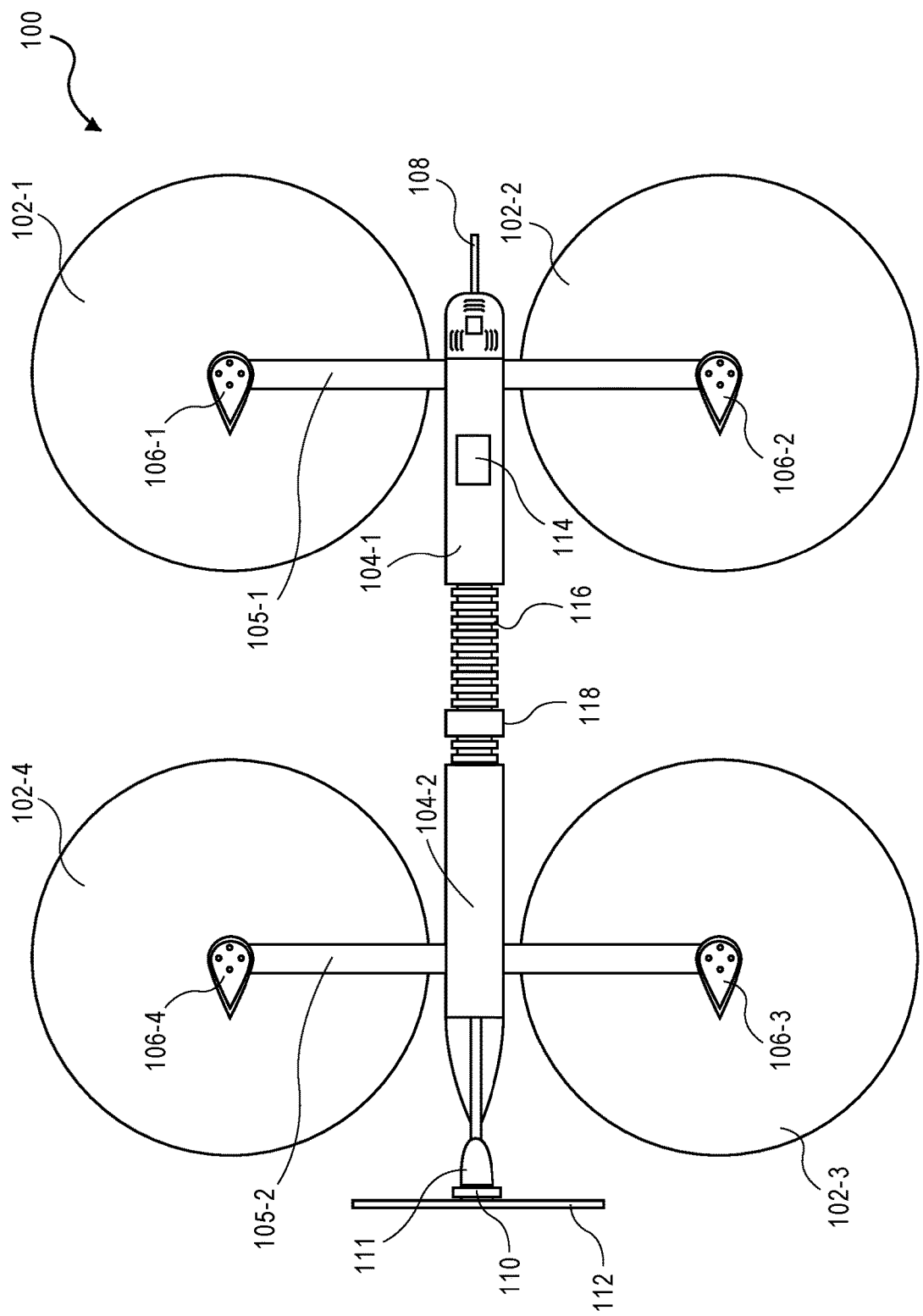
FIG. 1 depicts a block diagram of a top-down view of a multirotor aircraft, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of a multirotor aircraft that facilitates enhanced yaw control. The multirotor aircraft includes one or more adjustable members that allow twisting of the frame of the multirotor aircraft, thereby adjusting the orientation of the motors and propellers, and enhancing the yaw control of the multirotor aircraft. Alternatively, the aircraft frame may be constructed of two or more portions that may have their relative orientations altered (e.g., twisted, bent, displaced, etc.) to enhance control of the aircraft. In some implementations, the adjustable member(s) are passive and twist in response to forces generated by the propellers. In other implementations, the adjustable members are active and twist in response to a yaw command from a multirotor aircraft control system. Still further, in some implementations, an amount of stiffness of the adjustable members may be altered. For example, when the multirotor aircraft is following a navigation path in a mostly horizontal direction, the stiffness of the flexible member may be increased to improve the efficiency, stability, flutter and/or other flight characteristics of horizontal flight. In comparison, when the multirotor aircraft is navigating in a confined area, altering orientation, etc., the stiffness of the adjustable member may be decreased to enhance the maneuverability of the multirotor aircraft in response to a yaw command.

The multirotor aircraft may have any number of lifting motors and any configuration. For example, the multirotor aircraft may include four lifting motors (also known as a quadcopter), eight lifting motors (also known as an octo-copter), etc. Likewise, to improve the efficiency of horizontal flight, the multirotor aircraft may also include a thrusting motor and propeller assembly that is oriented approximately parallel to a direction of forward flight, and/or oriented at approximately ninety degrees to one or more of the lifting motors, the frame of the multirotor aircraft and/or the motor arm(s) of the multirotor aircraft. When the multirotor aircraft is moving horizontally, the thrusting motor may be engaged and the thrusting propeller will aid in the horizontal propulsion of the multirotor aircraft. In some implementations, the rotational speed of the lifting motors may be reduced when the thrusting motor is engaged, thereby improving efficiency and reducing power consumption of the multirotor aircraft. Likewise, in some implementations, the multirotor aircraft may include a wing to aid in the vertical lift of the multirotor aircraft while the multirotor aircraft is moving horizontally.

To further improve the efficiency of the multirotor aircraft, in some implementations, the frame, motor arms, fuselage, wing, propellers, and/or other components of the multirotor aircraft may be formed of one or more lightweight materials, such as carbon fiber, graphite, machined aluminum, titanium, fiberglass, etc.

Regardless of material, each of the motor arms, motor housing, and/or fuselage may be hollow, thereby reducing weight and providing a cavity through which one or more wires and/or cables may be passed and/or in which other components may be housed. For example, wires that connect the motors (e.g., lifting motors, thrusting motors) to components located in or around the frame (e.g., electronic speed control ("ESC")) may be passed through the inner portion of one or more of the motor housings and motor arms.

FIG. 1 illustrates a block diagram of a top-down view of a multirotor aircraft 100, according to an implementation. As illustrated, the multirotor aircraft 100 includes a frame 104. The frame 104 or body of the multirotor aircraft 100 may be formed of any suitable material, such as graphite, carbon fiber, aluminum, etc., or any combination thereof. In this example, the frame 104 of the multirotor aircraft 100 is formed of machined aluminum in a rectangular shape.

In this example, rather than a single rigid frame 104, an adjustable member 116 is positioned at an approximate mid-point in the frame 104. The adjustable member is configured to twist, thereby enhancing the maneuverability of the multirotor aircraft 100 in response to a yaw command. The adjustable member 116 may be passive or active. In a passive configuration, the adjustable member 116 twists in response to differential thrusts generated by the propellers 102 rotating at different speeds. The adjustable member 116 may be formed of any flexible or semi-flexible material, such as metal, fiberglass, carbon fiber, plastic, elastomer, rubber, etc. In some implementations, the twisting of the adjustable member 116 may vary depending on the position of the adjustable member 116. For example, the twisting of the adjustable member at an initial or default position may require less force to initiate twisting. As the adjustable member twists, it may require a greater force to continue the twisting. Likewise, the adjustable member 116 may include one or more stops that limit the degree of twisting of the adjustable member in different directions. Alternatively, or in addition thereto, the adjustable member 116 may include one or more mechanical components that will cause the adjustable member to twist. For example, the adjustable member 116 may be formed to include a leadscrew (also known as a screw-drive, power screw, or translation screw) such that the front frame 104-1 and rear frame 104-2 will twist about an axis, springs, bearings, swivels, joints, gears, or other mechanical components that will allow the front frame 104-1 and rear frame 104-2 to twist about an axis.

In an active configuration, the adjustable member 116 may also include an actuator, such as a servo motor, pneumatic motor, piezoelectric motor, etc., that will twist the adjustable member 116 and cause the front frame 104-1 and the rear frame 104-2 to rotate about an axis in response to a yaw command. In such a configuration, the adjustable member 116 may rotate the frame 104 in response to a yaw command received from the multirotor aircraft control system, independent of or in addition to a rotation caused by the differential thrusts generated by the propellers.

In some implementations, the stiffness of the adjustable member 116 may itself be adjustable. For example, the adjustable member 116 may include a variable stiffness controller 118 that may be moved along the length of the adjustable member 116 to vary the stiffness of the adjustable member 116. For example, if the adjustable member 116 is a spring, the variable stiffness controller may be adjusted to alter the spring constant of the spring, thereby adjusting the stiffness of the spring. Likewise, if the adjustable member 116 is active and includes an actuator, such as a motor (e.g., servo motor, pneumatic motor, piezoelectric motor), the responsiveness of the actuator may be altered to increase or decrease the stiffness of the adjustable member 116. In still other examples, the adjustable member 116 and/or the variable stiffness controller 118 may include a piezoelectric component with a feedback circuit. The feedback circuit may monitor the amount of twisting and vary the amount or rate of stiffness of the adjustable member. Still other examples include the use of pneumatic controllers, air bladders, etc. to vary the stiffness of the adjustable member.

Likewise, the adjustable member 116 may include an adjustable dampener (not shown) that controls the twisting rate or dynamic response of the adjustable member 116. For example, the dampener may be adjusted to slow the response of the adjustable member to differential forces, thereby slowing the rate of rotation of the multirotor aircraft 100.

While the example illustrated in FIG. 1 includes a single adjustable member 116 positioned at an approximate mid-point of the frame 104, in other configurations, the multirotor aircraft may include additional adjustable members, such as the configuration illustrated in FIGS. 8-9, discussed below, and/or the adjustable member(s) may be at different locations on the multirotor aircraft, such as the configurations illustrated in FIGS. 4-7, discussed below.

Mounted to the frame 104 are two motor arms 105-1, 105-2. In this example, the motor arms 105-1, 105-2 are approximately the same length, are arranged substantially parallel to one another and perpendicular to the frame 104. In other implementations, the motor arms 105 may be of different lengths (e.g., the front motor arm 105-1 may be shorter than the rear motor arm 105-2 and/or arranged at different locations on the multirotor aircraft 100).

Mounted to each end of the motor arms 105 are lifting motors 106-1, 106-2, 106-3, and 106-4. In one implementation, the lifting motors 106 are mounted so that the propeller shaft of the lifting motor that mounts to the propeller 102 is facing downward with respect to the multirotor aircraft 100. In other implementations, the lifting motors may be mounted with the propeller shaft facing upwards with respect to the multirotor aircraft 100. In still other implementations, one or more of the lifting motors may be mounted with the propeller shaft facing downward and one or more of the lifting motors may be mounted with the propeller shaft facing upward. In other implementations, the lifting motors may be mounted at other orientations with respect to the frame of the multirotor aircraft 100. The lifting motors may be any form of motor capable of generating enough rotational speed with the propellers to lift the multirotor aircraft 100 and any engaged payload, thereby enabling aerial transport of the multirotor aircraft and the payload.

Mounted to each lifting motor is a lifting propeller 102-1, 102-2, 102-3, and 102-4. The lifting propellers 102 may be any form of propeller (e.g., graphite, carbon fiber) and of a size sufficient to lift the multirotor aircraft 100 and any payload engaged by the multirotor aircraft 100 so that the multirotor aircraft 100 can navigate through the air, for example, to deliver a payload to a delivery location. For example, the lifting propellers 102 may each be carbon fiber propellers having a dimension or diameter of twenty-nine inches. While the illustration of FIG. 1 shows the lifting propellers 102 all of a same size, in some implementations, one or more of the lifting propellers 102 may be different sizes and/or dimensions. Likewise, while this example includes four lifting propellers, in other implementations, more or fewer propellers may be utilized as lifting propellers. Likewise, in some implementations, the propellers may be positioned at different locations on the multirotor aircraft 100. In addition, alternative methods of propulsion may be utilized as "motors" in implementations described herein. For example, fans, jets, turbojets, turbo fans, jet engines, internal combustion engines, and the like may be used (either with propellers or other devices) to provide thrust for the multirotor aircraft.

Mounted to front frame 104-1 of the multirotor aircraft 100 is one or more antennas 108. The antennas 108 may be used to transmit and/or receive wireless communications. For example, the antennas 108 may be utilized for Wi-Fi, satellite, near field communication ("NFC"), cellular communication, or any other form of wireless communication. Other components, such as cameras, time of flight sensors, distance determining elements, gimbals, etc., may likewise be mounted to the front frame 104-1 of the multirotor aircraft 100, and/or at other locations on the multirotor aircraft 100.

In this example, motor arm 105-1 and corresponding lifting motors 106-1, 106-2 and lifting propellers 102-1, 102-2 are mounted to the front frame 104-1. Motor arm 105-2 and corresponding lifting motors 106-3, 106-4 and lifting propellers 102-3, 102-4 are mounted to the rear frame 104-2.

Mounted to the rear frame 104-2 of the multirotor aircraft 100 is a thrusting motor housing 111, a thrusting motor 110 and a thrusting propeller 112. The thrusting motor housing 111 may be aerodynamically shaped and configured to encase the thrusting motor 110. The thrusting motor 110 and the thrusting propeller 112 may be the same or different than the lifting motors 106 and lifting propellers 102. For example, in some implementations, the thrusting motor 110 may be a Tiger U-8 motor and the thrusting propeller 112 may have a dimension of eighteen inches. In some implementations, the thrusting propeller may have a smaller dimension than the lifting propellers.

The thrusting motor 110 and thrusting propeller 112 may be oriented at approximately ninety degrees with respect to the frame 104 of the multirotor aircraft 100 and utilized to increase the efficiency of flight that includes a horizontal component by generating horizontal thrust. For example, when the multirotor aircraft 100 is traveling in a direction that includes a horizontal component, the thrusting motor 110 may be engaged to provide horizontal thrust via the thrusting propeller to propel the multirotor aircraft 100 horizontally. As a result, the speed and power utilized by the lifting motors may be reduced. Alternatively, in selected implementations, the thrusting motor 110 may be oriented at an angle greater or less than ninety degrees with respect to frame 104 to provide a combination of thrust and lift.

The multirotor aircraft control system 114, discussed further below with respect to FIG. 10, may also be coupled to one or more locations of the frame 104 of the multirotor aircraft. In this example, the multirotor aircraft control system 114 is mounted to the front frame 104-1 and may be enclosed in a protective barrier. The protective barrier provides the multirotor aircraft control system 114 weather protection so that the multirotor aircraft 100 may operate in rain and/or snow without disrupting the multirotor aircraft control system 114. In some implementations, the protective barrier may have an aerodynamic shape to reduce drag when the multirotor aircraft 100 is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received and carbon fiber may be utilized in other areas of the protective barrier.

Figure 2:
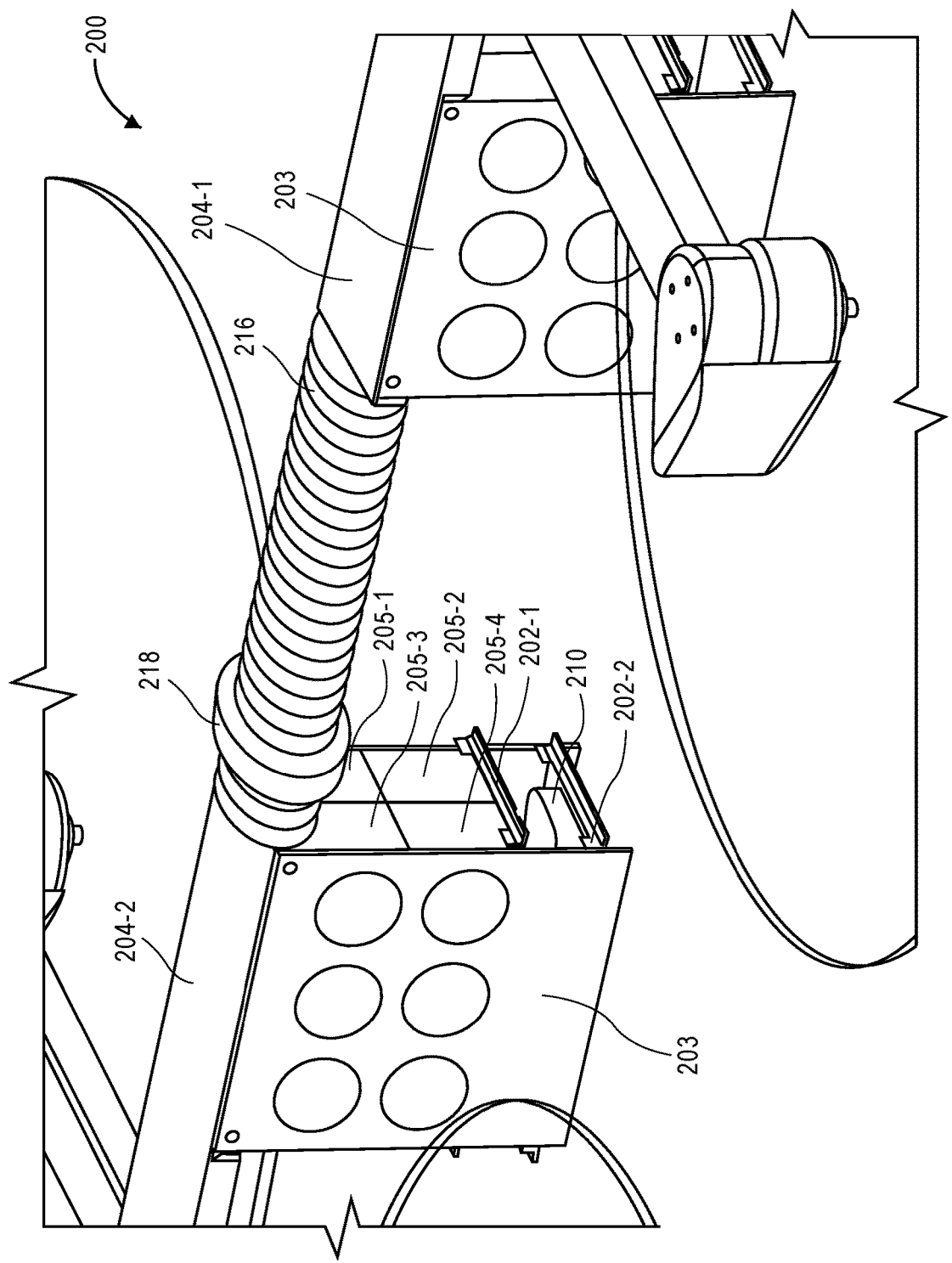
FIG. 2 depicts a view of a multirotor aircraft with an adjustable member, such as the multirotor aircraft illustrated in FIG. 1, according to an implementation.

FIG. 2 depicts a view of a multirotor aircraft 200 with an adjustable member, such as the multirotor aircraft 100 illustrated in FIG. 1, according to an implementation. As illustrated, the frame 204 includes an adjustable member 216. In this example, the adjustable member 216 is a cylindrical leadscrew. The stiffness of the adjustable member 216 may be varied using the variable stiffness controller 218. When a differential thrust is generated by the propellers of the multirotor aircraft, the adjustable member 216 twists, thereby rotating the front frame 204-1 and the rear frame 204-2. Rotation or twisting of the frame is discussed further below with respect to FIG. 3.

The frame 204 may also include one or more grooves or indents into which power supply containers 203 may be positioned and attached to the frame 204. In some implementations, the grooves of the frame 204 may be angled and designed to provide a friction fit with the power supply containers. In other implementations, the power supply containers 203 may be removably mounted to the frame 204 using screws, rivets, quarter-turn fasteners, or other attachment mechanisms. In still other implementations, the power supply containers 203 may be permanently mounted to the frame 204 and/or formed as part of the frame 204.

The power supply containers 203 may include one or more shelves 202 that may be positioned within the power supply container 203. The shelves 202-1, 202-2 may be removable from the power supply containers 203. For example, the shelves 202 may be designed to mount or fit in the power supply container 203 on rails. The rails and shelves 202 may be movable horizontally and/or vertically to facilitate placement of different size power supplies, other components, and/or a payload. The power supplies 205 may be in the form of battery power, solar power, gas power, super capacitor, fuel cell, alternative power generation source, or a combination thereof. For example, the power supplies 205 may each be a 6000 mAh lithium-ion polymer battery, polymer lithium ion (Li-poly, Li-Pol, LiPo, LIP, PLI or Lip) battery, etc.

The power supplies 205 may be individually removed and/or the entire shelf 202 may be removed with all of the supporting power supplies. Likewise, the power supply containers 203 may include one or more openings (e.g., holes) on the sides of the power supply container to facilitate heat dissipation from the supported power supplies and/or other components.

The shelves of the power supply containers 203 may also support other components and/or payloads. For example, one or more components 210 of the multirotor aircraft control system may be included on the shelves 202 of the power supply containers 203, as illustrated in FIG. 2. Likewise, a power distribution unit to which the power supplies 205 are connected may be supported by one of the shelves of the power supply container. For example, the power distribution unit may be mounted to a shelf of the power supply container 203 and all of the power supplies may be coupled to the power distribution unit. The power distribution unit may then be coupled to the multirotor aircraft control system and/or other components of the multirotor aircraft to provide power. In some implementations, the connection between the power distribution unit and the multirotor aircraft control system may be a single coupling, such as a magnetic coupling, male/female connection, etc., to facilitate complete exchange of the power supply container 203.

In another example, the power supply container 203 may support a payload, such as an item to be delivered by the multirotor aircraft to a destination.

Figure 3:
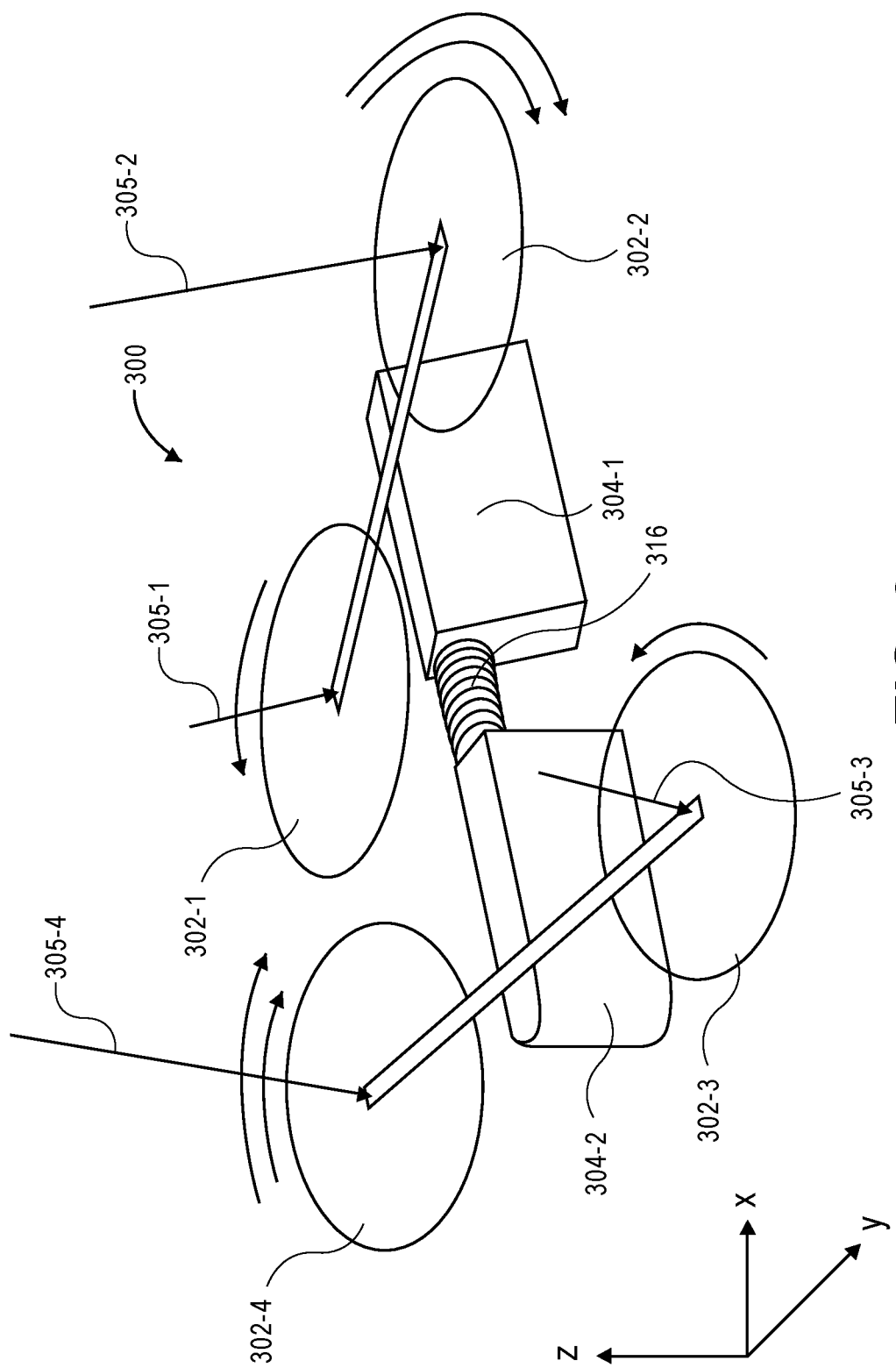
FIG. 3 depicts a view of a multirotor aircraft, such as the multirotor aircraft illustrated in FIG. 1, twisting about an adjustable member to enhance a yaw adjustment of the multirotor aircraft, according to an implementation.

FIG. 3 depicts a view of a multirotor aircraft 300, such as the multirotor aircraft illustrated in FIG. 1, twisting about an adjustable member to enhance a yaw of the multirotor aircraft, according to an implementation. As discussed above, the frame of multirotor aircraft 300 includes a front portion 304-1 and a rear portion 304-2. The multirotor aircraft 300 also includes an adjustable member 316 that couples the front portion 304-1 and the rear portion 304-2. The adjustable member causes the multirotor aircraft 300 to yaw by twisting such that the first position 304-1 rotates in a first direction about an axis and the second portion 304-2 rotates in a second direction about the axis.

When viewed from a top-down perspective as illustrated in FIG. 3, the twisting of the multirotor aircraft causes the multirotor aircraft to yaw in a counter-clockwise direction. The twisting of the multirotor aircraft by the adjustable member may be caused by a first differential thrust between the first propeller 302-1 and the second propeller 302-2 and a second differential thrust between third propeller 302-3 and the fourth propeller 302-4.

In this example, the first propeller 302-1 rotates in a counter-clockwise direction at a first speed and generates a first thrust 305-1. The second propeller 302-2 rotates in a clockwise direction at a second speed that is faster than the first speed and generates a second thrust 305-2 that is larger than the first thrust 305-1. Because the first thrust 305-1 and the second thrust 305-2 are different, a first differential thrust is generated. In a similar manner, the third propeller 302-3 rotates in a counter-clockwise direction at a third speed and generates a third thrust 305-3. The fourth propeller 302-4 rotates in a clockwise direction at a fourth speed that is greater than the third speed and generates a fourth thrust 305-4 that is larger than the third thrust 305-3. Because the third thrust 305-3 and the fourth thrust 305-4 are different, a second differential thrust is generated. In some implementations, the second thrust 305-2 and the fourth thrust 305-4 may be approximately equal. Likewise, the first thrust 305-1 and the third thrust 305-3 may be approximately equal.

As illustrated, the two differential thrusts are opposing which cause twisting at the adjustable member 316. Specifically, the first differential thrust and the second differential thrust generate a torque at the adjustable member 316, thereby causing the adjustable member 316 to twist. The twisting of the adjustable member causes the first portion 304-1 of the frame to rotate in a first direction about an axis and causes the second portion 304-2 to rotate in a second direction about the axis, which in turn changes the orientations of the propellers 302. The change in the orientation of the propellers alters the direction of the thrust generated by the propellers that enhances the yaw of the multirotor aircraft 300 in the counter-clockwise direction.

A clockwise yaw of the multirotor aircraft may likewise be enhanced because the adjustable member 316 will twist in the opposite direction when the first thrust 305-1 generated by the first propeller 302-1 is greater than the second thrust 305-2 generated by the second propeller 302-2 and the third thrust 305-3 generated by the third propeller 302-3 is greater than the fourth thrust 305-4 generated by the fourth propeller 302-4.

The adjustable member may also include a variable stiffness controller (not shown) that may be utilized to adjust the stiffness of the adjustable member 316. For example, the adjustable member may have a first stiffness in which the adjustable member will twist in response to torque caused by differential thrusts acting in opposite directions. A high flexibility results in the multirotor aircraft having a higher yaw agility as the adjustable member will twist in response to a small amount of torque causing the orientations of the propeller to change, thereby enhancing the yaw of the multirotor aircraft. In some implementations, a dampener may also be included that controls the rate of the twisting of the adjustable member in response to the torque. Dampening the rate of rotation may be beneficial to aid in the control of the multirotor aircraft.

In some implementations, the adjustable member 316 may be an active adjustable member and include an actuator, such as a servo motor, piezoelectric motor, pneumatic motor, etc., that will cause the adjustable member to twist in response to a yaw command. In such an implementation, rather than or in addition to the forces generated by the propellers being adjusted to generate differential thrusts to cause the multirotor aircraft to yaw, the actuator may twist the adjustable member 316, which results in the orientation of the propellers and the direction of the forces generated by the propellers to alter, thereby enhancing the yaw of the multirotor aircraft. For example, if a yaw command is received, the adjustable member may twist, causing the first portion 304-1 of the frame to rotate in a first direction about an axis and the second portion 304-2 of the frame to rotate in a second direction about the axis. In such a configuration, the twisting of the adjustable member and rotation of the portions of the frame alters the orientations of the propellers 302. By altering the orientations of the propellers, the direction of the thrusts generated by the propellers changes, thereby causing the multirotor aircraft to yaw. In such a configuration, a yaw of the multirotor aircraft may be performed without directly altering the rotational speeds of the motors or the forces generated by the propellers.

In this example, adjacent propellers are rotating in opposite directions to balance the rotational force generated by the propellers when the orientation of the propellers are all approximately the same. In some implementations, all of the propellers of the multirotor aircraft 300 may rotate in the same direction. For example, all of the propellers 302 of the multirotor aircraft 300 may rotate in a counter-clockwise direction.

In a typical multirotor aircraft, having all the propellers rotate in the same direction would cause the aircraft to yaw due to the moment generated by the propellers. However, by maintaining a twist at the adjustable member 316, as illustrated in FIG. 3, which causes the pairs of propellers to remain at offsetting or different orientations, the multirotor aircraft can operate with the propellers all spinning in the same direction. For example, all of the propellers 302 of the multirotor aircraft may spin in a counter-clockwise direction. By maintaining the adjustable member 316 in a twisted state such that the front portion 304-1 is rotated in a first direction about an axis and the second portion 304-2 is rotated in a second direction about the axis, the multirotor aircraft 300 will maintain a hover without a yaw, even if the propellers are generating similar thrusts. To invoke a yaw, the thrust generated by the propellers may be altered and/or the twisting of the adjustable member may be increased or decreased.

Figure 4:
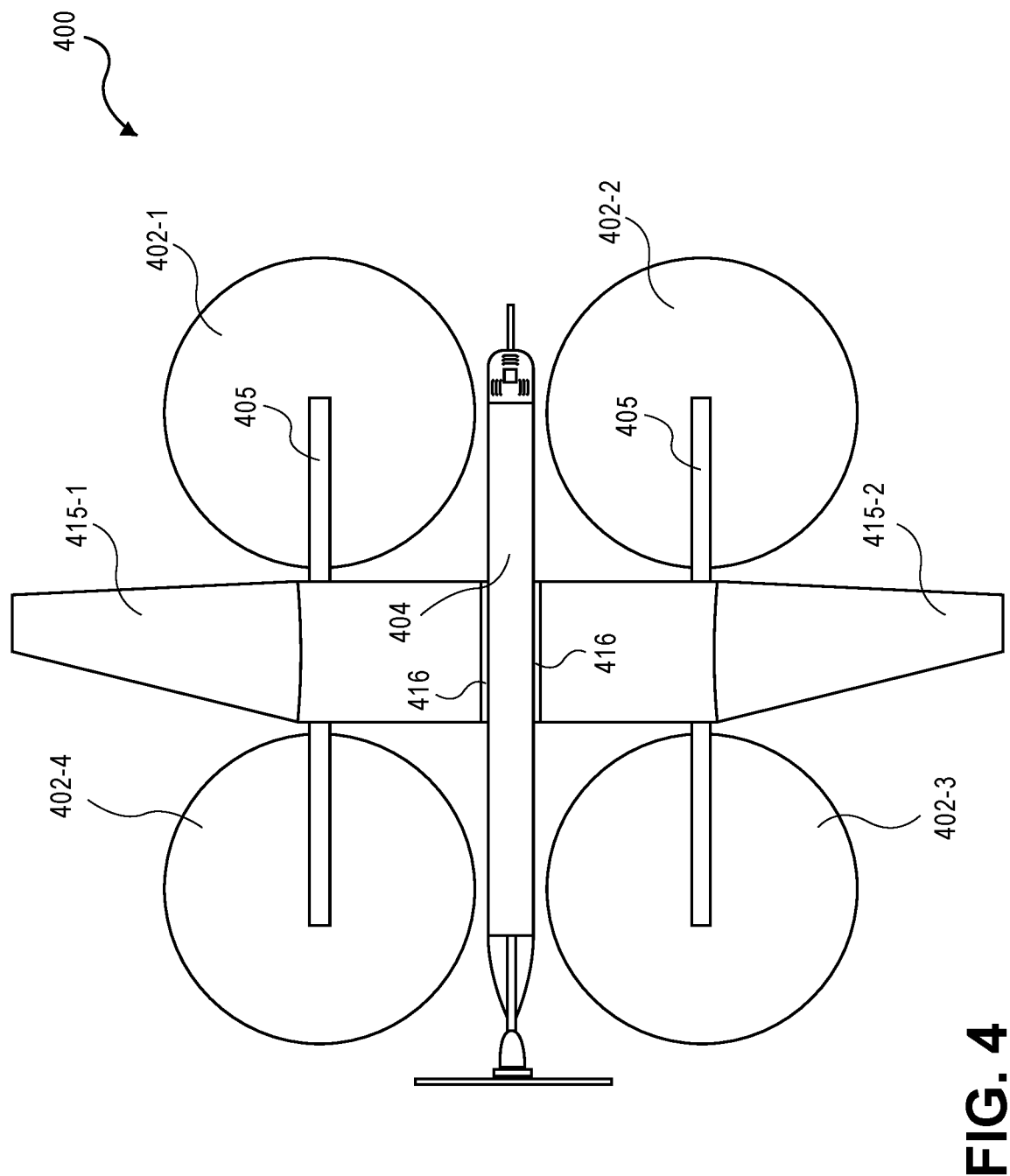
FIG. 4 depicts a block diagram of a top-down view of a multirotor aircraft, according to an implementation.

FIG. 4 depicts a block diagram of a top-down view of a multirotor aircraft 400, according to an implementation. In the example illustrated in FIG. 4, the multirotor aircraft 400 includes wings 415-1, 415-2 coupled to the frame of the multirotor aircraft 400 and the motor arms 405 are coupled to the wings 415. Similar to other components, the wings 415 may be formed of any suitable material such as, but not limited to, carbon fiber, aluminum, fabric, plastic, fiberglass, etc. In this implementation, the adjustable members 416 are between the wings 415 and the frame 404 of the multirotor aircraft 400. As with the other adjustable members discussed herein, the adjustable members 416 may be passive or active and the stiffness of the adjustable members 416 may also be changed.

As discussed further below, in response to differential thrusts generated by the propellers 402-1, 402-2, 402-3, 402-4, and/or in response to a yaw command, the adjustable members 416 cause the wings 415 of the multirotor aircraft to twist about an axis with respect to the frame of the multirotor aircraft 400, thereby increasing the maneuverability of the multirotor aircraft and enhancing the yaw command. Twisting of the adjustable members is discussed further below with respect to FIG. 5.

The wings 415 are designed to have an airfoil shape to provide lift to the multirotor aircraft 400 as the multirotor aircraft 400 moves horizontally. In some implementations, utilizing the thrusting motor and thrusting propeller in conjunction with the wings 415, when the multirotor aircraft 400 is moving in a direction that includes a horizontal component, the rotational speed of the lifting motors and lifting propellers 402 may be reduced or eliminated, because the wings 415 provide lift and keep the multirotor aircraft 400 airborne when thrust in a horizontal direction by the thrusting motor and thrusting propeller is applied. In some implementations, the wings 415 include flaps and/or ailerons that may be used to adjust the pitch, yaw, and roll of the multirotor aircraft 400. The ailerons may be used in conjunction with the adjustable member and/or the lifting motors and lifting propellers 402 to alter the pitch, yaw, and/or roll of the multirotor aircraft. In some implementations, the adjustable members 416 may also be configured to rotate or pivot the wings 415 about the frame 404 of the multirotor aircraft when the multirotor aircraft 400 is moving in a substantially vertical direction to reduce drag caused by the wings 415.

Figure 5:
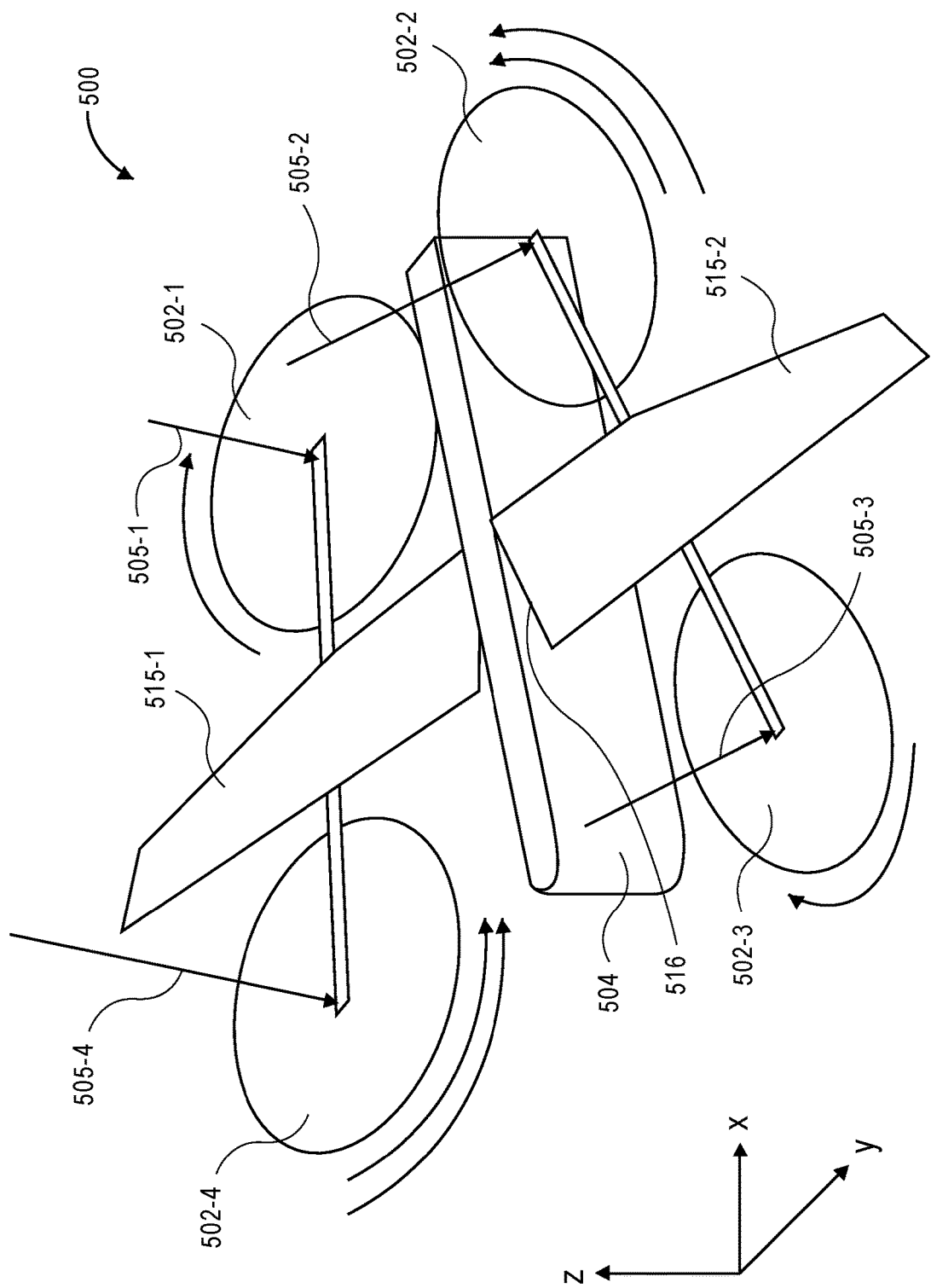
FIG. 5 depicts a view of a multirotor aircraft, such as the multirotor aircraft illustrated in FIG. 4, twisting about an adjustable member to enhance a yaw adjustment of the multirotor aircraft, according to an implementation.

FIG. 5 depicts a view of a multirotor aircraft 500, such as the multirotor aircraft illustrated in FIG. 4, twisting about an adjustable member 516 to enhance a yaw adjustment of the multirotor aircraft 500, according to an implementation. As discussed above, the adjustable member 516 couples the wings 515-1, 515-2 to the frame 504. In response to differential thrusts generated by the propellers 502 and/or in response to a yaw command, the adjustable member twists causing the wings 515-1, 515-2 to rotate about an axis, thereby altering the orientation of the propellers 502-1, 502-2, 502-3, 502-4.

Figure 6:
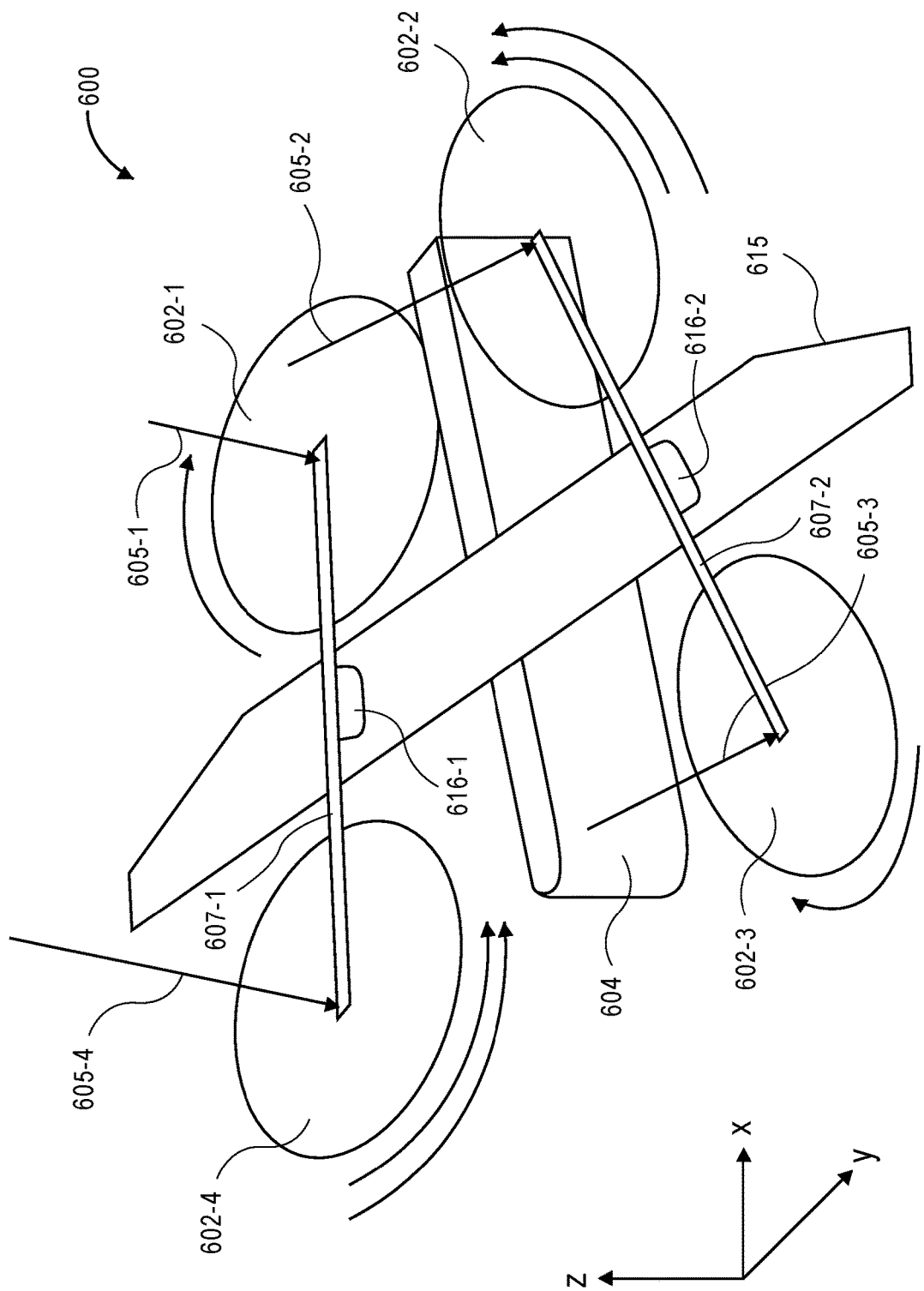
FIG. 6 depicts another view of a multirotor aircraft, twisting about an adjustable member to enhance a yaw adjustment of the multirotor aircraft, according to an implementation.
Figure 7:
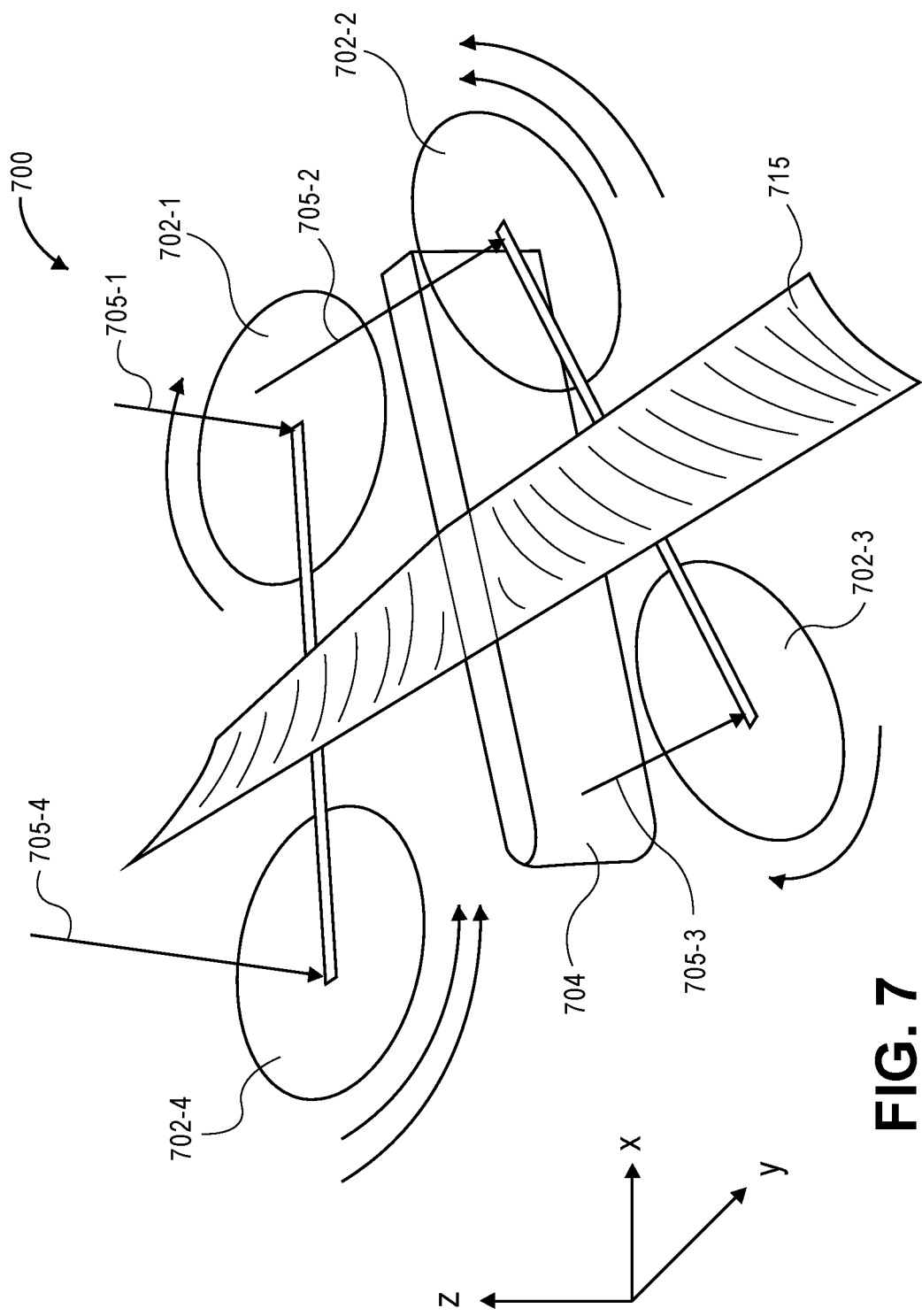
FIG. 7 depicts another view of a multirotor aircraft, twisting about an adjustable member to enhance a yaw adjustment of the multirotor aircraft, according to an implementation.

In some implementations, as illustrated in FIGS. 6 and 7, a single wing may be utilized that is coupled to the frame 504 and acts as the adjustable member. In other implementations, each wing 515-1, 515-2 may be coupled to the frame 504 by a separate adjustable member 516. In this example, a first differential thrust is generated because a second thrust 505-2 generated by the second propeller 502-2 is greater than a third thrust 505-3 generated by the third propeller 502-3. A second differential thrust is also generated because a fourth thrust 505-4 generated by the fourth propeller 502-4 is greater than a first thrust 505-1 generated by the first propeller 502-1. The two differential thrusts cause the adjustable members 516 to twist, as illustrated in FIG. 5. The twisting of the multirotor aircraft 500 illustrated in FIG. 5 causes the multirotor aircraft 500 to yaw in a clockwise direction.

A counter-clockwise yaw of the multirotor aircraft 500 may likewise be enhanced because the adjustable members 516 will twist in the opposite direction when the third thrust 505-3 generated by the third propeller 502-3 is greater than the second thrust 505-2 generated by the second propeller 502-2 and the first thrust 505-1 generated by the first propeller 502-1 is greater than the fourth thrust 505-4 generated by the fourth propeller 502-4.

The adjustable member may also include a variable stiffness controller that may be utilized to adjust the stiffness of the adjustable member. For example, the adjustable member may have a first stiffness in which the adjustable member will twist in response to any torque. A high flexibility (low stiffness) results in the multirotor aircraft having a higher yaw agility as the adjustable member will twist in response to torque, causing the orientations of the propeller to change, thereby enhancing the yaw of the multirotor aircraft. High agility may be beneficial when the multirotor aircraft is operating in confined spaces, such as during landing or takeoff. In comparison, the variable stiffness controller may increase the stiffness of the adjustable member such that the adjustable member will only twist when the two differential thrusts exceed a threshold. In such a configuration, the adjustable member of the multirotor aircraft is stiffer and may provide higher efficiency, but less agility. This may be beneficial when the multirotor aircraft is traveling in a direction that includes a horizontal component. In some implementations, a dampener may also be included that controls the rate of the twisting of the adjustable member(s) in response to the torque. Dampening the rate of rotation may be beneficial to aid in the control of the multirotor aircraft.

In some implementations, the adjustable member may be an active adjustable member and include an actuator, such as a servo motor, pneumatic motor, piezoelectric motor, etc., that will cause the adjustable member to twist in response to a yaw command. In such an implementation, rather than or in addition to the forces generated by the propellers being adjusted to generate differential thrusts to cause the multirotor aircraft to yaw, the actuator may twist the adjustable member 516, which results in the orientation of the propellers and the direction of the forces generated by the propellers to alter, thereby enhancing the yaw of the multirotor aircraft. For example, if a yaw command is received, the adjustable member may twist, causing the first wing 515-1 to rotate in a first direction about an axis and the second wing 515-2 to rotate in a second direction about the axis. In such a configuration, the twisting of the adjustable member and rotation of the wings alters the orientations of the propellers 502. By altering the orientations of the propellers, the direction of the thrust generated by the propellers changes, thereby causing the multirotor aircraft to yaw. In such a configuration, a yaw of the multirotor aircraft may be performed without directly altering the rotational speeds of the motors or the forces generated by the propellers.

In implementations in which the multirotor aircraft 500 is traveling in a direction that includes a horizontal component, the adjustable member may be utilized to perform a roll of the multirotor aircraft 500. For example, by altering the orientations of the wings, the forces generated by the wings when the multirotor aircraft is moving in a direction that includes a horizontal component will change, thereby causing the multirotor aircraft 500 to roll.

FIG. 6 depicts another view from above of a multirotor aircraft 600, twisting about adjustable members 616 to enhance a yaw adjustment of the multirotor aircraft, according to an implementation. In this example, the multirotor aircraft 600 includes a single wing 615 coupled to the frame 604 of the multirotor aircraft 600. Each of the motor arms 607-1, 607-2 are coupled to the wing 615 via adjustable members 616-1, 616-2, respectively. In this example, the second propeller 602-2 is generating a second thrust 605-2 that is greater than a third thrust 605-3 generated by the third propeller 602-3, thereby generating a first differential thrust. Likewise, the fourth propeller 602-4 is generating a fourth thrust 605-4 that is greater than a first thrust 605-1 generated by the first propeller 602-1, thereby generating a second different thrust. The opposing differential thrusts generate torque that causes the first motor arm 607-1 to twist about the adjustable member 616-1 in a first direction and the second motor arm 607-2 to twist about the adjustable member 616-2 in a second direction. Because the wing 615 is fixed, the adjustable members cause twisting of the motor arms 607 in a see-saw like fashion with respect to the wing 615. The twisting of the motor arms 607 with respect to the wing alters the orientations of the motors and propellers 602 thereby enhancing the yaw of the multirotor aircraft 600. In this example, when viewed from above as illustrated, the multirotor aircraft 600 will yaw in a clockwise direction and the twisting of the motor arms 607 will enhance that yaw by altering the orientation of the motors and propellers 602.

Similar to the adjustable members discussed above, the adjustable members 616 illustrated in FIG. 6 may also include variable stiffness controllers and/or dampeners. Likewise, the adjustable members 616 may operate as a passive adjustable members, twisting in response to differential thrusts and torques generated by the propellers and/or may include an actuator, such as a servo motor, pneumatic motor, piezoelectric motor, etc., that actively twists the motor arms 607 with respect to the wing 615. For example, the adjustable members 616 may each include an actuator that receives commands from the multirotor aircraft controller to twist the motor arms 607 with respect to the wing 615, thereby causing the multirotor aircraft 600 to yaw.

FIG. 7 depicts another view from above of a multirotor aircraft 700, twisting about an adjustable member to enhance a yaw adjustment of the multirotor aircraft, according to an implementation. In this example, the multirotor aircraft 700 includes a single wing 715 coupled to the frame 704 of the multirotor aircraft and the wing 715 operates as the adjustable member. In this example, the second propeller 702-2 is generating a second thrust 705-2 that is greater than a third thrust 705-3 generated by the third propeller 702-3, thereby generating a first differential thrust. Likewise, the fourth propeller 702-4 is generating a fourth thrust 705-4 that is greater than a first thrust 705-1 generated by the first propeller 702-1, thereby generating a second different thrust. The opposing differential thrusts generate torque that causes the wing 715, which in this example is also the adjustable member, to twist. The twisting of the wing 715 alters the orientations of the propellers 702 thereby enhancing the yaw of the multirotor aircraft 700. In this example, when viewed from above as illustrated, the multirotor aircraft 700 will yaw in a clockwise direction and the twisting of the wing 715 will enhance that yaw by altering the orientation of the propellers 702.

Similar to the adjustable members discussed above, the wing 715 illustrated in FIG. 7 may also include a variable stiffness controller and/or a dampener. Likewise, the wing 715 may operate as a passive adjustable member, twisting in response to differential thrusts and torque generated by the propellers and/or may include an actuator, such as a servo motor, pneumatic motor, piezoelectric motor, etc., that actively twists the wing 715. For example, the wing may include an actuator that receives commands from the multirotor aircraft controller to twist the wing 715, thereby causing the multirotor aircraft 700 to yaw.

Figure 8:
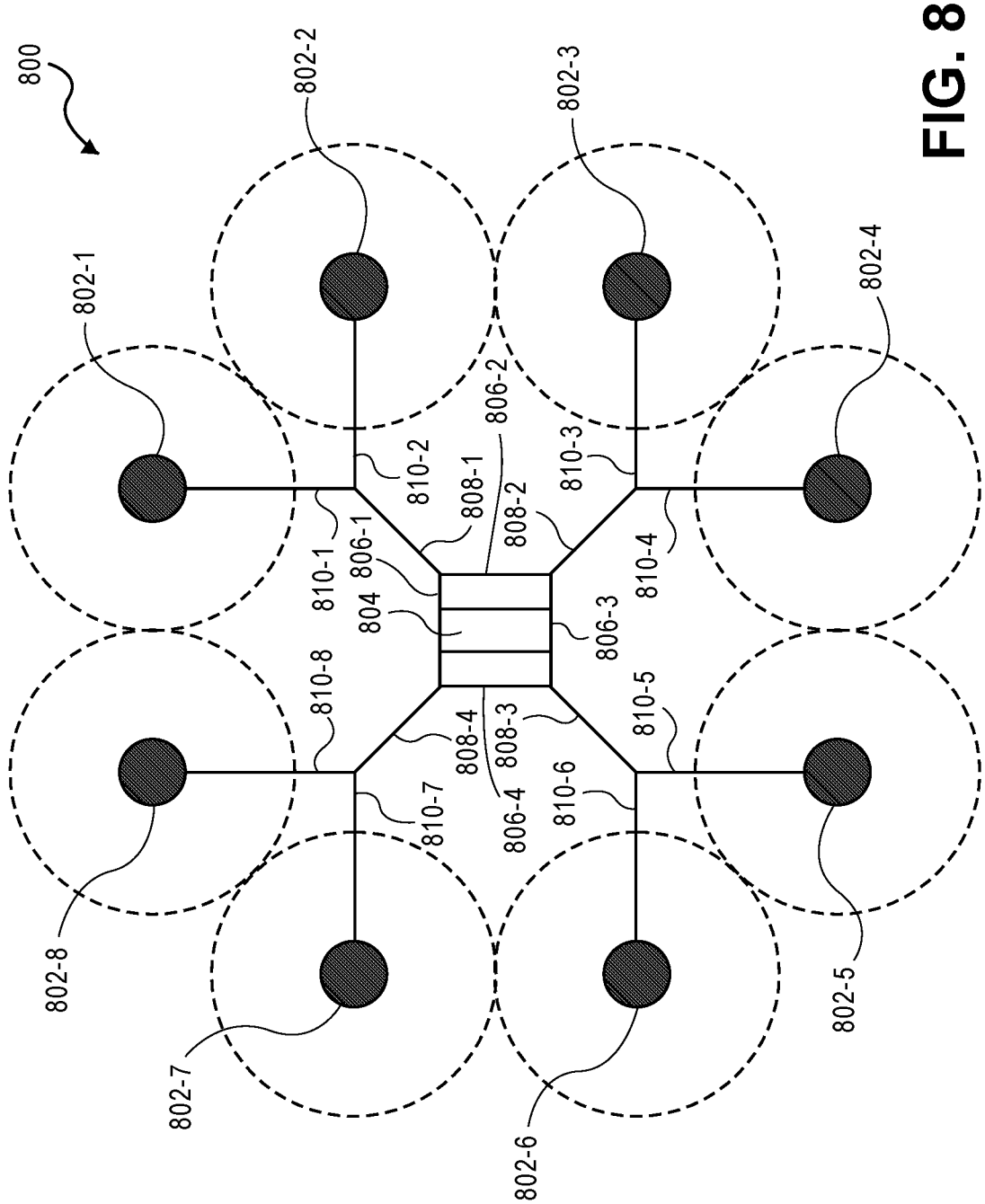
FIG. 8 depicts a block diagram of a top-down view of a multirotor aircraft, according to an implementation.

FIG. 8 depicts a block diagram of a top-down view of a multirotor aircraft 800, according to an implementation. As illustrated, the multirotor aircraft 800 is configured to support eight motors 802-1, 802-2, 802-3, 802-4, 802-5, 802-6, 802-7, and 802-8. Each of the motors 802 may be configured to rotate one or more propellers to enable flight of the multirotor aircraft 800. In the illustrated implementation, the propellers may be up to 30 inches in diameter, as illustrated by the dashed circles around each motor 802.

In this example, the multirotor aircraft 800 is symmetrically designed from the core outward to enable easy manufacture of multirotor aircraft 800 parts and for ease of assembly and/or disassembly. Turning first to the core 804, the core may include four support arms connected at 90 degree angles using the two 90 degree connection points of Y attachment members. Extending from the third connection point of each Y attachment member that is used to connect the support arms of the core is an extension arm 808-1, 808-2, 808-3, and 808-4. Because of the configuration of the universal Y attachment members, each extension arm is extending from the core 804 at approximately a one hundred thirty-five (135) degree angle from the support arms 806.

Connected to the opposing end of each extension arm, using the universal Y attachment member, are two motor arms 810-1, 810-2, 810-3, 810-4, 810-5, 810-6, 810-7, 810-8. To enable connection of the motor arms, the third connection point of the universal Y attachment member is connected with the end of the extension arm 808 such that the two connection points of the universal Y attachment member that are at ninety (90) degrees extend outward from the extension arm 808. Mounting the motor arms 810 to the two ninety (90) degree connection points extending from each extension arm 808 results in the configuration illustrated in FIG. 8.

The motors 802 are connected to the protruding end of each of the motor arms 810, as illustrated. The motors 802 may be any form of motor capable of generating enough speed with the propellers to lift the multirotor aircraft 800 and any engaged inventory thereby enabling aerial transport of the inventory. For example, the motors 802 may each be a Lumeneir FX 4006-13 740 kv multi rotor motor.

As with the other multirotor aircraft configurations discussed herein, the material of the support arms, the extension arms 808, and the motor arms 810 may be any suitable material, such as graphite, aluminum, carbon fiber, steel, titanium, or any other material. The cross-sectional shape of the arms 808, 810 and/or the universal Y attachment members 800 may be square, round, rectangular, hexagonal, etc. As discussed further below with respect to FIG. 9, the universal Y attachment members that connect the motor arms 810 to the extension arm 808 may be configured to operate as an adjustable member.

In some implementations, to enable sufficient separation for use of thirty-inch (30") propellers, each of the support arms 806 may be ten inches (10") in length, each of the extension arms 808 may be twelve and one-half inches (12.5") in length, and each of the motor arms 810 may be twenty-one and one-half inches in length (21.5"). In other implementations, other lengths of any one of the support arms 806, extension arms 808 and/or motor arms 810 may be utilized. In addition, alternative methods of propulsion may be utilized. For example, fans, jets, turbojet, turbo fans, jet engines, and the like may be used to propel the multirotor aircraft.

Figure 9:
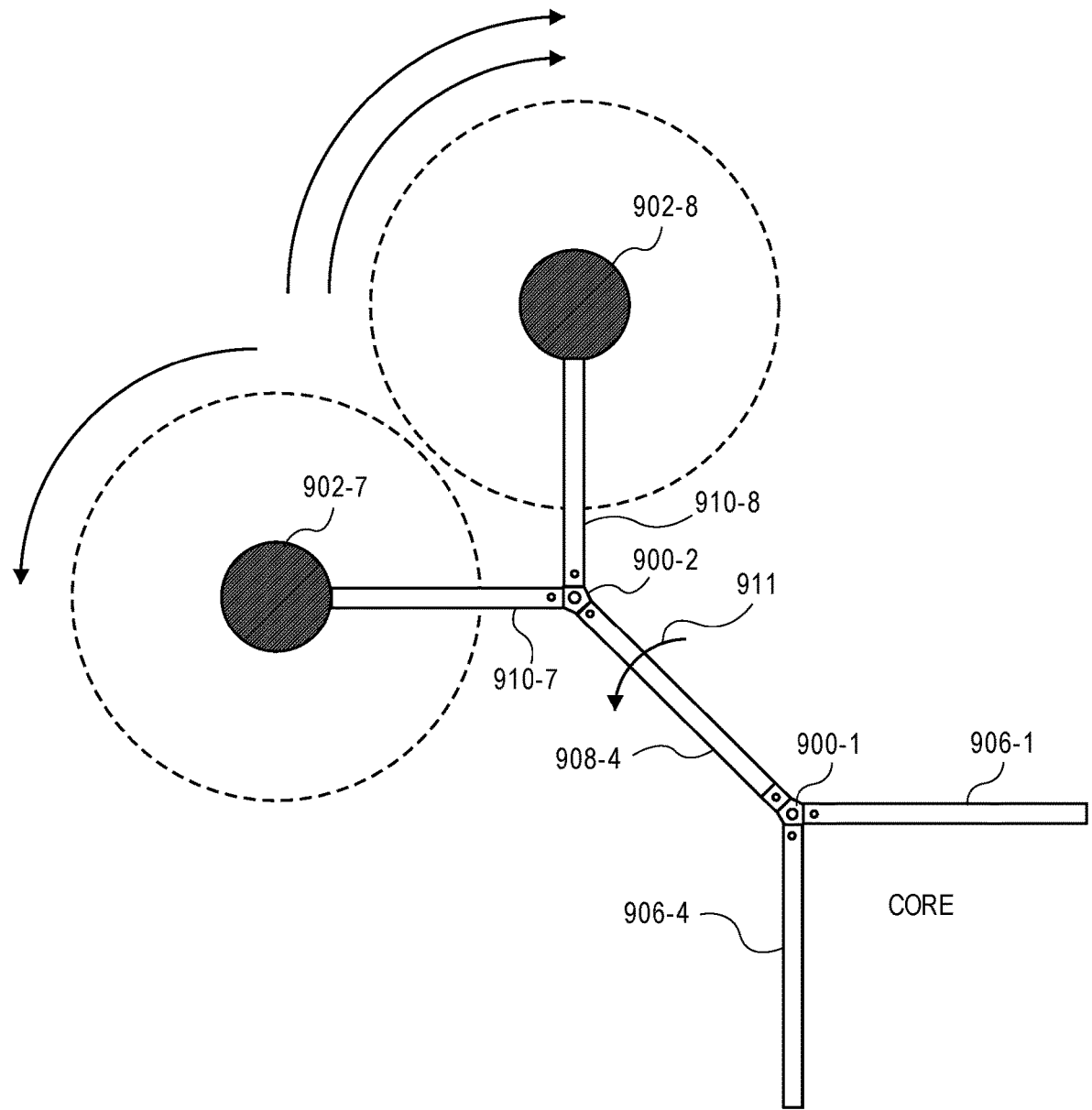
FIG. 9 depicts a block diagram of universal Y attachment members connecting two motor arms, an extension arm, and support arms that make up part of a multirotor aircraft, such as the multirotor aircraft illustrated in FIG. 8, according to an implementation.

FIG. 9 depicts a block diagram of universal Y attachment members 900 connecting two motor arms 910-7, 910-8, an extension arm 908-4, and support arms 906-1, 906-4 that make up part of a multirotor aircraft, such as the multirotor aircraft 800 illustrated in FIG. 8, according to an implementation. As illustrated, a first universal Y attachment member 900-1 is used in a first position to join the two support arms 906-1, 906-4 at approximately a ninety (90) degree angle. Likewise, one end of the extension arm 908-4 is attached to the first universal Y attachment member 900-1 and extends away from the two support arms at approximately a one hundred and thirty-five (135) degree angle.

On the opposing end of the extension arm 908-4, a second universal Y attachment member 900-2 is mounted in an inverted direction with respect to the first universal Y attachment member 900-1. Attached to the two other connection points of the second universal Y attachment member 900-2 are two motor arms 910-7, 910-8. By inverting the orientation of the second universal Y attachment member 900-2, the two motor arms 910-7, 910-8 extend and form approximately a ninety (90) degree angle between each other. This configuration may be done for each corner of the core of the multirotor aircraft and for each junction of motor arms 910 to form the multirotor aircraft discussed above with respect to FIG. 8.

In such a configuration, the universal Y attachment member 900-2, the universal Y attachment member 900-1, the extension arm 908-4 and/or the motor arms 910-7, 910-8 may operate as the adjustable member. For example, any one or more of the universal Y attachment member 900-2, the universal Y attachment member 900-1, the extension arm 908-4 and/or the motor arms 910-7, 910-8 may be formed of a material that will twist in response to differential thrusts generated by the propellers that are rotated by the motors 902-7, and 902-8. For example, if the motor 902-8 rotates faster than the motor 902-7, a differential thrust is generated that will cause the adjustable member to twist, as illustrated by the arrow 911. Any one or more of the universal Y attachment member 900-2, the universal Y attachment member 900-1, the extension arm 908-4, and/or the motor arms 910-7, 910-8 may provide the twisting of the adjustable member in response to the differential thrust.

Figure 10:
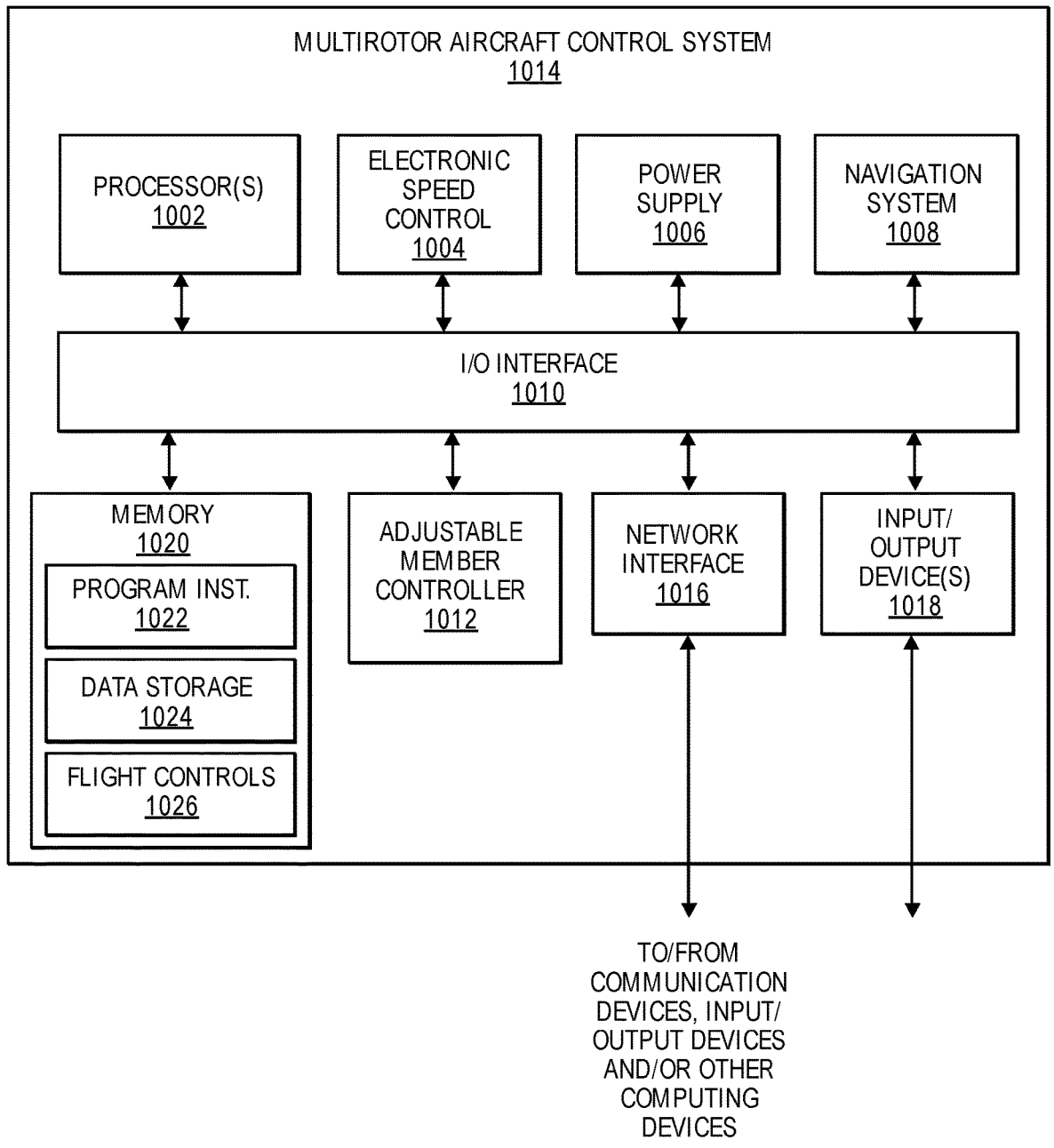
FIG. 10 is a block diagram of an illustrative implementation of a multirotor aircraft control system that may be used with various implementations.

FIG. 10 is a block diagram illustrating an example multirotor aircraft control system 1014 that may be used with the implementations discussed herein. In the illustrated implementation, the multirotor aircraft control system 1014 includes one or more processors 1002, coupled to a memory, e.g., a non-transitory computer readable storage medium 1020, via an input/output (I/O) interface 1010. The multirotor aircraft control system 1014 may also include electronic speed controls 1004 (ESCs), power supply modules 1006 and/or a navigation system 1008. The multirotor aircraft control system 1014 further includes an adjustable member controller 1012, a network interface 1016, and one or more input/output devices 1018.

In various implementations, the multirotor aircraft control system 1014 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, flight paths, flight control parameters, adjustment information, center of gravity information, and/or data items accessible by the processor(s) 1002. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1020 as program instructions 1022, data storage 1024 and flight controls 1026, respectively. In other implementations, program instructions, data, and/or flight controls may be received, sent, or stored upon different types of computer-accessible media, such as non-transitory media, or on similar media separate from the non-transitory computer readable storage medium 1020 or the multirotor aircraft control system 1014. Generally speaking, a non-transitory, computer readable storage medium may include storage media or memory media such as magnetic or optical media, e.g., disk or CD/DVD-ROM, coupled to the multirotor aircraft control system 1014 via the I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface or other peripheral interfaces, such as input/output devices 1018. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The ESCs 1004 communicate with the navigation system 1008 and adjust the rotational speed of each lifting motor and/or the thrusting motor to stabilize the multirotor aircraft and guide the multirotor aircraft along a determined flight path. Likewise, in some implementations, the ESCs 1004 may communicate with the adjustable member controller 1012 to determine the rotational speed needed for the motors based on the amount of twist in the frame of the multirotor aircraft that will be generated by the adjustable member.

The navigation system 1008 may include a global positioning system (GPS), indoor positioning system (IPS), or other similar system and/or sensors that can be used to navigate the multirotor aircraft 100 to and/or from a location. The adjustable member controller 1012 communicates with the navigation system 1008, the ESCs 1004, and/or the adjustable member(s) of the multirotor aircraft. For example, in response to a yaw command, the adjustable member controller 1012 causes the adjustable member to rotate or twist, thereby causing the frame of the multirotor aircraft to rotate or twist about the adjustable member.

The network interface 1016 may be configured to allow data to be exchanged between the multirotor aircraft control system 1014, other devices attached to a network, such as other computer systems (e.g., remote computing resources), and/or with multirotor aircraft control systems of other multirotor aircrafts. For example, the network interface 1016 may enable wireless communication between the multirotor aircraft and a multirotor aircraft control system that is implemented on one or more remote computing resources. For wireless communication, an antenna of a multirotor aircraft or other communication components may be utilized. As another example, the network interface 1016 may enable wireless communication between numerous multirotor aircrafts. In various implementations, the network interface 1016 may support communication via wireless general data networks, such as a Wi-Fi network. For example, the network interface 1016 may support communication via telecommunications networks, such as cellular communication networks, satellite networks, and the like.

Input/output devices 1018 may, in some implementations, include one or more displays, imaging devices, thermal sensors, infrared sensors, time of flight sensors, accelerometers, pressure sensors, weather sensors, etc. Multiple input/output devices 1018 may be present and controlled by the multirotor aircraft control system 1014. One or more of these sensors may be utilized to assist in landing as well as to avoid obstacles during flight.

As shown in FIG. 10, the memory may include program instructions 1022, which may be configured to implement the example routines and/or sub-routines described herein. The data storage 1024 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the multirotor aircraft control system 1014 is merely illustrative and is not intended to limit the scope of the present disclosure. In particular, the computing system and devices may include any combination of hardware or software that can perform the indicated functions. The multirotor aircraft control system 1014 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated multirotor aircraft control system 1014. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the multirotor aircraft control system 1014 may be transmitted to the multirotor aircraft control system 1014 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other multirotor aircraft control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of operating a multirotor aircraft, comprising:
generating a first differential thrust between a first motor and a second motor, the first motor coupled to a first end of a first motor arm and the second motor coupled to a second end of the first motor arm, the first motor arm coupled to a front frame of the multirotor aircraft;
generating a second differential thrust between a third motor and a fourth motor, the third motor coupled to a first end of a second motor arm and the fourth motor coupled to a second end of the second motor arm, the second motor arm coupled to a rear frame of the multirotor aircraft, the front frame coupled to the rear frame via an adjustable member, and the front frame, the adjustable member, and the rear frame extending along an axis;
generating a first rotation of the front frame in a first direction about the axis in response to the first differential thrust; and
generating a second rotation of the rear frame in a second direction about the axis in response to the second differential thrust;
wherein the axis is transverse to axes of rotation of the first, second, third, and fourth motors.

2. The method of claim 1, further comprising:
altering a first orientation of the first motor and a second orientation of the second motor due to the first rotation; and
altering a third orientation of the third motor and a fourth orientation of the fourth motor due to the second rotation.

3. The method of claim 1, further comprising generating a yaw moment of the multirotor aircraft in response to the first rotation and the second rotation.

4. The method of claim 1, wherein the adjustable member comprises at least one of a spring, a leadscrew, a gear, a bearing, a swivel, a joint, metal, fiberglass, carbon fiber, plastic, or an elastomeric material.

5. The method of claim 1, further comprising:
twisting the adjustable member about the axis via a motor coupled to the adjustable member in response to a yaw command.

6. A method of operating a multirotor aircraft, comprising:
generating a first differential thrust between a first motor and a second motor, the first motor coupled to a first portion of a frame of the multirotor aircraft, the frame extending along an axis and comprising the first portion and a second portion connected by an adjustable member; and
causing the multirotor aircraft to yaw by altering an orientation of the first portion of the frame with respect to the second portion of the frame about the axis via the adjustable member, the axis being transverse to axes of rotation of the first and second motors.

7. The method of claim 6, wherein the first differential thrust is generated by rotating the first motor at a different speed than the second motor.

8. The method of claim 6, wherein the orientation is altered in response to the first differential thrust generated between the first motor and the second motor of the first portion of the frame relative to a second differential thrust generated between a third motor and a fourth motor of the second portion of the frame.

9. The method of claim 8, further comprising:
rotating the first motor and the third motor in a first direction; and
rotating the second motor and the fourth motor in a second direction.

10. The method of claim 8, further comprising:
rotating each of the first motor, the second motor, the third motor, and the fourth motor in a first direction.

11. The method of claim 8, wherein the orientation is altered by:
causing the first portion of the frame to rotate in a first direction about the axis; and
causing the second portion of the frame to rotate in a second direction about the axis.

12. The method of claim 6, wherein the orientation of the first portion of the frame with respect to the second portion of the frame is altered via an actuator associated with the adjustable member.

13. The method of claim 12, wherein the orientation is altered via the actuator in response to a yaw command.

14. The method of claim 6, further comprising varying a stiffness of the adjustable member via a controller.

15. The method of claim 6, wherein the orientation is altered by causing a wing of the multirotor aircraft to rotate with respect to the frame.

16. A method of operating an aircraft, comprising:
generating a first differential thrust between a first motor and a second motor of the aircraft;
causing a first rotation of a first portion of a frame of the aircraft in a first direction about an axis via an adjustable member at least partially in response to the first differential thrust; and
causing a second rotation of a second portion of the frame of the aircraft in a second direction about the axis via the adjustable member;
wherein the first portion of the frame, the adjustable member, and the second portion of the frame extend along the axis;
wherein the first portion is coupled to the second portion via the adjustable member; and
wherein the axis is transverse to axes of rotation of the first and second motors.

17. The method of claim 16, further comprising:
generating a second differential thrust between a third motor and a fourth motor of the aircraft;
wherein the second rotation is caused at least partially in response to the second differential thrust.

18. The method of claim 17, wherein the first motor and the second motor are coupled to opposing ends of a first motor arm coupled to the first portion of the frame; and
wherein the third motor and the fourth motor are coupled to opposing ends of a second motor arm coupled to the second portion of the frame.

19. The method of claim 16, wherein the adjustable member comprises at least one of a spring, a leadscrew, a gear, a bearing, a swivel, a joint, metal, fiberglass, carbon fiber, plastic, an elastomeric material, or an actuator.

20. The method of claim 16, further comprising:
twisting the adjustable member about the axis via an actuator coupled to the adjustable member in response to a yaw command.

* * * * *